United States Patent [19]

Hatten et al.

[11] 4,282,430

[45] Aug. 4, 1981

[54] REFLECTION-TYPE PHOTOELECTRIC SWITCHING APPARATUS

[75] Inventors: Hideaki Hatten, Muko; Norio Onji, Kyoto; Koichi Tsujino, Kyoto; Toshifumi Fukuyama, Kyoto, all of Japan

[73] Assignee: Omron Tateisi Electronics Co., Kyoto, Japan

[21] Appl. No.: 47,082

[22] Filed: Jun. 11, 1979

[30] Foreign Application Priority Data

Jun. 19, 1978 [JP] Japan .................................. 53-74032

[51] Int. Cl.³ .............................................. G01V 9/04
[52] U.S. Cl. ..................................... 250/221; 250/239
[58] Field of Search ................ 250/221, 222, 239, 560, 250/561; 356/1; 340/555, 556, 557

[56] References Cited

U.S. PATENT DOCUMENTS

| | | |
|---|---|---|
| 3,002,420 | 10/1961 | Willits et al. |
| 3,435,744 | 4/1969 | Stimson .................................... 356/1 |
| 3,620,625 | 11/1971 | Tegholm .................................... 356/1 |
| 3,697,762 | 10/1972 | Kurtz ...................................... 250/239 |
| 3,740,562 | 6/1973 | Fertig ..................................... 250/221 |
| 3,817,631 | 6/1974 | Kawahara .................................. 356/1 |
| 4,051,365 | 9/1977 | Fukuyama ................................. 250/222 |

*Primary Examiner*—David C. Nelms
*Attorney, Agent, or Firm*—Wegner & Bretschneider

[57] ABSTRACT

A reflection-type photoelectric switching apparatus for providing an electric switching signal indicating existance information of an object to be detected thereby comprising a light projecting device for projecting a beam of light to the object, a light receiving photoelectric device arranged in side-by-side relation with the light projecting device for receiving a reflected light from the object, an optical axis adjusting means which is controllable from outside of housing of the apparatus for adjusting the optical axes of the light projecting and receiving devices, and optical members which allow both the light beam from the projecting device and the light beam to be incident on the receiving device to pass within a predetermined light path so that the two light beams will be crossed in a desired detection field, the distance from the apparatus to the desired detection field being continuously variable by the optical axis adjusting means.

11 Claims, 5 Drawing Figures

REFLECTION-TYPE PHOTOELECTRIC SWITCHING APPARATUS

BRIEF SUMMARY OF THE INVENTION

The present invention relates to a reflection-type photoelectric switching apparatus which projects a beam of light from a light projecting device to an object and receives a reflected light from the object to detect the presence of the object, and more particuraly to a reflection-type photoelectric switching apparatus capable of detecting a object which exists only at a desired distance from the switching apparatus.

The conventional photoelectric switching apparatus is essentially such that the axes of projected and reflected lights are nearly parallel with each other and the detection field is wide and deep. Such apparatus has the disadvantage that when anything other than the object to be detected exists immediately behind the latter, the apparatus detects that thing, too. Particularly when such an adjacent thing or object has the same reflection factor as that of the object to be detected, the prior art apparatus cannot selectively detect the latter object alone, for the detection with such apparatus depends on differences in reflection factor among objects. As one of the results, the prior art apparatus cannot be installed overhead of the conveyer line, in which position the apparatus is obviously sensitive not only to the object to be detected but also to objects adjacent thereto, e.g. the conveyor belt as such. Moreover, the conventional apparatus is disadvantageous in that it is difficult to obtain a complete seal of the components against foreign matter. To obtain a complete seal, such apparatus must be sealed, in assembling, not only at the lid cover which closes the housing but also at the light transmitting and light receiving windows.

It is, therefore, a primary object of the present invention to provide a reflection-type photoelectric switching apparatus which is capable of detecting an object present only in a predetermined detection range which is very small in width and depth.

It is a further object of the present invention to provide a reflection-type photoelectric switching apparatus which is capable of detecting only the object in a predetermined detection range even if anything other than the object exists immediately in front of or behind the latter, irrespective of the reflection factor of such adjacent thing.

It is a still further object of the present invention to provide a reflection-type photoelectric switching apparatus in which the distance from the switching apparatus to the predetermined detection range can be easily and continually varied.

It is another object of the present invention to provide a reflection-type photoelectric switching apparatus in which a transparent front window member for transmitting the projected and reflected light rays serves as a sole lid cover for closing the housing of the switching apparatus in order to minimize the required sealing area, and thereby to simplify the assembling operation.

According to one aspect of the present invention, there is provided: In a reflection-type photoelectric switching apparatus having a light projecting device for projecting a beam of light to an object, a light receiving photoelectric device arranged in side-by-side relation with the light projecting device for receiving a reflected light from the object, a circuit device operatitive in response to output signals from the light receiving device for generating a switching output signal, and a housing for enclosing the light projecting and receiving devices and circuit device, the improvement comprising an optical axis adjusting means which is controllable from outside of the housing for adjusting the optical axis of at least one of said light projecting and receiving devices, the light projecting and receiving devices respectively having optical members which allow both the light beam from the projecting device and the light beam to be incident on the receiving device to pass within a predetermined light path having a predetermined effective zone so that said two light beams will be crossed in a desired detection field, the distance from the photoelectric switching apparatus to the desired detection field being continuously variable by said optical axis adjusting means.

BRIEF DESCRIPTION OF DRAWINGS

Other objects as well as the numerous advantages of the reflection-type photoelectric switching apparatus according to the present invention will become apparent from the following detailed description and the accompanying drawings, in which.

DETAILED DESCRIPTION

Figure 1:
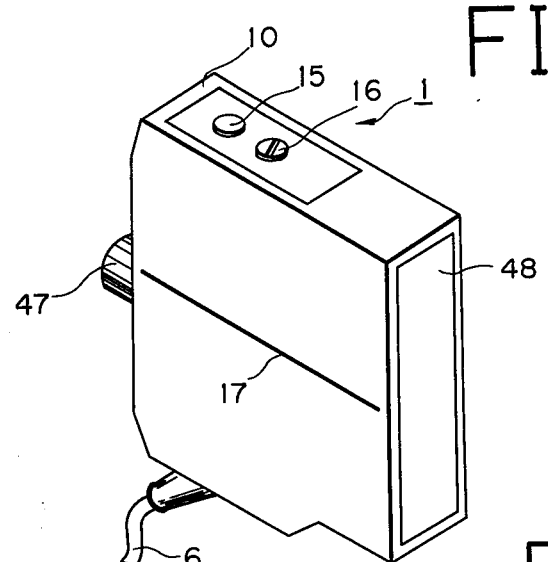
FIG. 1 is a perspective view of a reflection-type photoelectric switching apparatus as one preferred embodiment of the present invention.

Referring, now, to FIG. 1, there is shown a reflection-type photoelectric switching apparatus 1, as one embodiment of the present invention, which is enclosed by an optically opaque case 10, a front opening of the case 10 being fitted with an optically transparent window member 48 which is capable of transmitting projected and reflected light rays.

Figure 2:
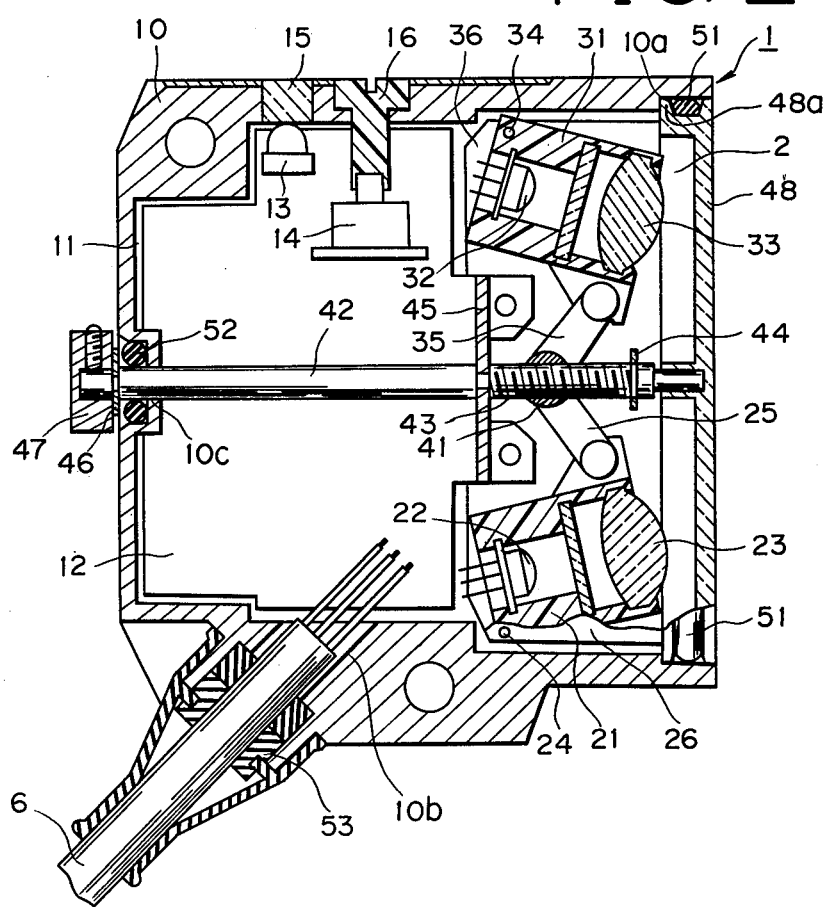
FIG. 2 is a partially sectional side elevational schematic view of the switching apparatus shown in FIG. 1.

In FIG. 2, there is shown a partially sectional side view of the apparatus of FIG. 1. In a cavity 11 of the case 10, there are disposed a print-circuit board 12, a light projecting element holder 21, a light receiving element holder 31 and other associated members. Though not shown in the drawings the board 12 carries as mounted thereon a light projecting circuit which comprises an oscillation circuit and an amplification circuit, and a light receiving circuit which comprises a detection circuit, an amplification circuit, and a switching circuit. An indicating lamp 13 which is also mounted on the board 12 is a display for indicating the operation status of the switching apparatus 1; e.g. when the apparatus 1 detects an object, the lamp 13 projects a beam of light out from the case 10 via a display window 15. A variable resistor 14 which is also mounted on the board 12 is adjustable from outside of the case 10 via a rotatable knob 16 built into the case 10, so as to adjust the sensitivity of the apparatus 1.

The light projecting element holder 21 which is rotatably supported by a pin 24 extending through side walls 26 and 36 of the window member 48 holds a light projecting element 22, such as a light emitting diode or the like, and a convex lens 23 for converging the projected light rays from the element 22 into a light beam having a small sectional area. The said light projecting elment holder 21, projecting element 22 and convex lens 23, taken together, form a light projecting device. The light receiving element holder 31 which is rotatably supported by a pin 34 extending through the side walls 26 and 36 holds a light receiving element 32, such as a photo-transistor or the like, and a convex lens 33 for selectively allowing reflected light rays from the object present only in a confined detection field to be incident on the light receiving element 32. The said light receiving element holder 31, projecing element 32 and convex lens 33, taken together, form a light receiving device. The light projecting and receiving element holders 21 and 31 are connected to link members 25 and 35 respectively so that they may be driven by a movable nut 41.

The transparent window member 48 is disposed in front of the lenses 23 and 33 and preferably supports rotatably one end of a rotatable shaft 42 which is rotatably supported by a bearing stand 45, the other end of the shaft 42 extending through the case 10 outwardly. The rotatable shaft 42 has a threaded portion 43 which is engaged by the movable nut 41. The said other end of the shaft 42 at the back of the case 10 is fixed by an E-shaped ring 46 from outside for rotational movement and is fitted with a knob 47. When the knob 47 is manually rotated from outside of the case 10, the movable nut 41 moves forward or backward, the movement being only restricted by a stopper 44 and the bearing stand 45, respectively, and the link members 25 and 35 operatively associated with the nut 41 varies the angular position of the holders 21 and 31 in opposite directions at the same angle.

To ensure a hermetic seal of the apparatus, rubber packings 51, 52 and 53 are provided at an outlet 10b for a cable 6 serving as power and signal transmission lines, at the joint between a recessed portion 10a of case 10 and a peripheral portion 48a of the window member 48 and between the case 10 and shaft 42 at the back of the case where the shaft is supported. According to the present embodiment, since the light projecting and receiving devices can be manually driven from outside the housing without affecting the seal, the internal components such as the circuit devices, light elements 22, 23 and associated mechanisms are fully protected.

Figure 5:
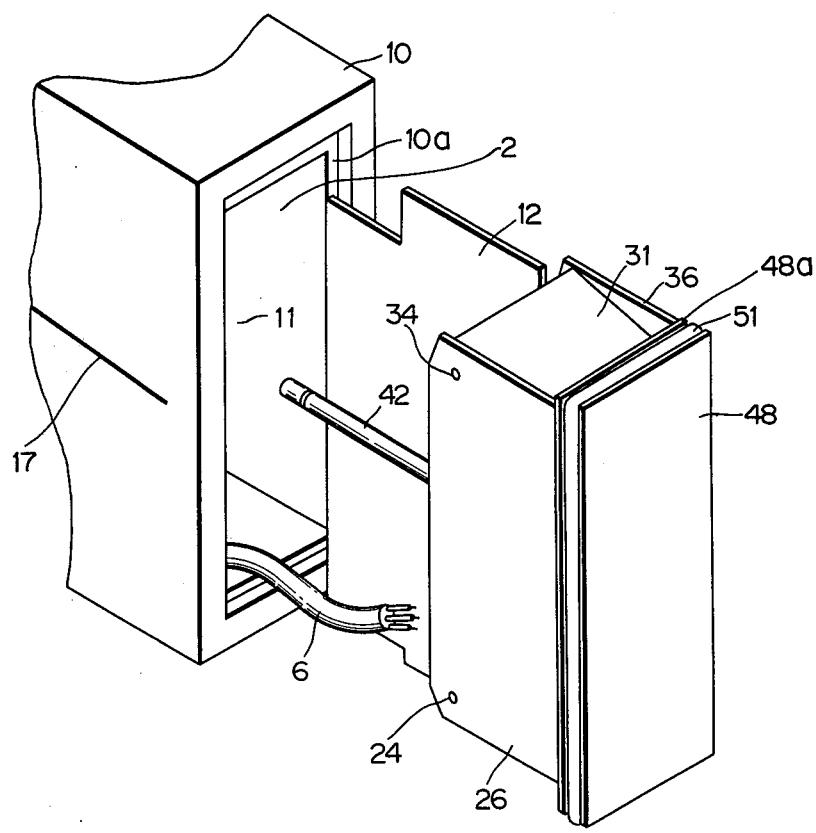
FIG. 5 is a perspective partial schematic view of the apparatus of FIG. 2 before final assembling.

The procedure for assembling the switching apparatus 1 will be explained below by reference to FIGS. 2 and 5. First, the print-circuit board 12 on which desired circuits including the cable 6 have been formed is taken together with the light projecting and receiving element holders 21 and 31, window member 48, rotatable shaft 42, and other associated components which form a pre-assembled unit. Secondly, the cable 6 is inserted into the outlet 10b of the case 10 and the board 12 of the assembled unit is inserted into the cavity 11 through the front opening 2 which has a sufficient sectional area to permit entry of the assembled unit and fits the circumferential edge 48a. When the shaft 42 has extended through an opening 10c of the back wall of the case 10 and the project portion of the shaft 42 has been fixed by the E-shaped ring 46, the assembling procedure is completed. It is clear that the assembling procedure comprises only inserting the pre-assembled unit form the front opening 2 and securing the projecting end of shaft 42 from outside. The outlet 10b is positioned at an angle so that the cable 6 can easily be inserted or withdrawn therethrough.

Figure 3:
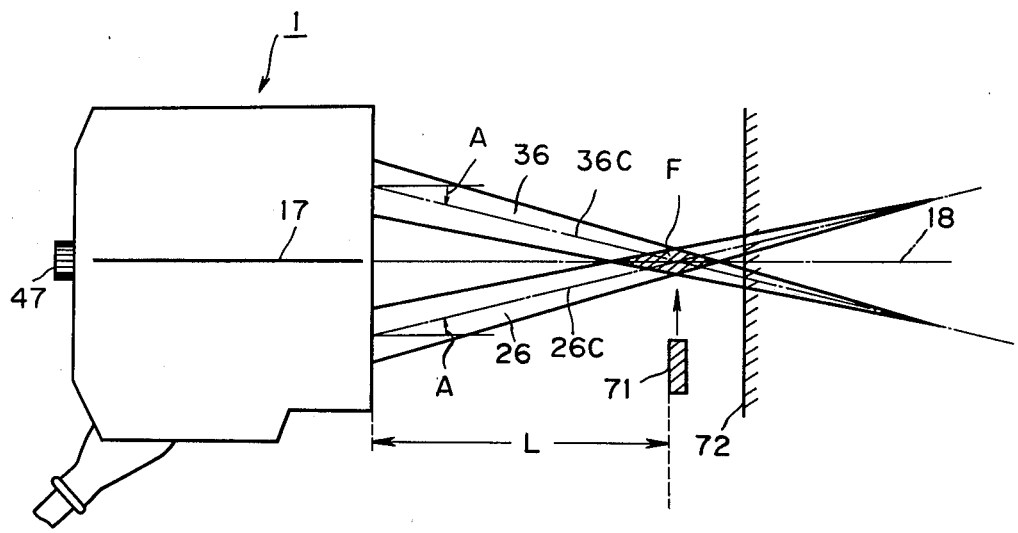
FIG. 3 is a side view of the apparatus of FIG. 1 for illustrating the operation of the apparatus.

As shown in FIG. 3, the apparatus 1 having convex lenses 23 and 33 has a predetermined light path in which two light beams 26 and 36 are allowed to pass. The two beams 26 and 36 have optical axes 26c and 36c, respectively, at an angle A. The beam 26 is a projected light ray bundle as converged by the lens 23, and the beam 36 is the reflected light ray bundle which is incident on the lens 33. The shape of the beam 36 corresponds to the shape of a light ray bundle which would be emerging from the lens 33 if the receiving element 32 is assumed to project light rays through the lens 33. The beams 26 and 36, respectively, have a small sectional area, and are adapted to cross each other in a predetermined small field F (shown in oblique lines) which is a detection field of this apparatus 1. When the knob 47 is manually rotated, the light projecting and receiving element holders 21 and 31 move at the same time and change the angles A of the optical axes 26c and 36c, so that a detection distance L from the apparatus 1 to the detection field F, i.e. the crossing portion of the two beams 26 and 36, can be adjusted into a desired distance. Such detection field F moves on the center line 18 between the holders 21 and 31.

Figure 4:
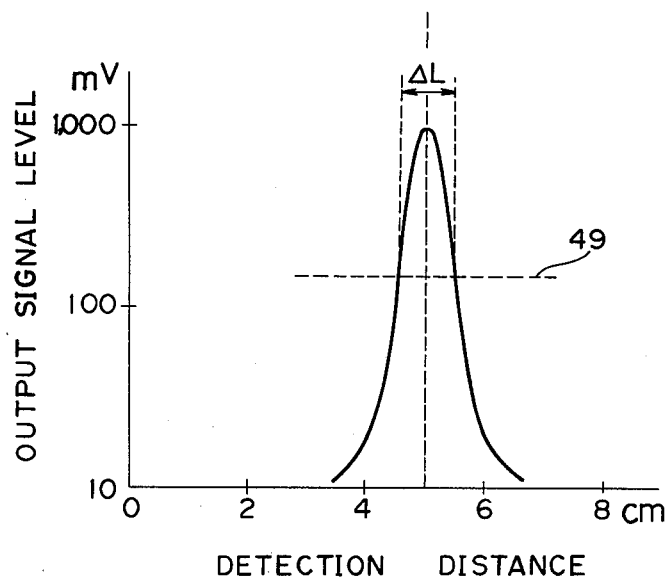
FIG. 4 is a graph for showing the relation between the detection distance from the apparatus to an object and the output signal level from the light receiving device in proportion to the detection distance about the apparatus of FIG. 3.

FIG. 4 shows an output signal amplitude obtained from the light receiving element 32 vs. a detection distance L from the apparatus to an object 71 present in front of the apparatus. When a detection level 49 is determined by the variable resistor 14 operatively associated with the knob 16, the detection field in which the apparatus 1 is able to detect the object 71 is limited to a length ΔL in the position of the center of the detection field F. It will be obvious that the length ΔL and, hence, the detection field F are minimal when the sectional areas of beams 26 and 36 in the crossing zone are minimal.

When the detection distance L which can be adjusted with the knob 47 is adjusted into a desired distance, the object 71 only is detected and anything that is not present within the field F, e.g. a back wall 72, is not detected by the apparatus 1. This is true even if both the object 71 and the wall have the same optical reflection factor. It has been confirmed by experiment that the apparatus 1 can easily detect a 2 mm height and 3 mm square film-type capacitor which is carried on a conveyer belt, both the capacitor and the conveyer belt being the same green color. It has also been confirmed that the conventional apparatus cannot detect any object, on the same conveyer belt, which is green, lower than 2 cm in height and smaller than 3 cm square. It would be understood from FIG. 4 that since the output signal level generated from the light receiving element has such a sharp curve at the detection level vs. the detection distance L, the apparatus 1 can precisely detect such a small size object which is carried on the conveyer belt, irrespective of the color.

When it is necessary to adjust the detection distance L, an indication mark 17 formed on the side outer wall and showing the center line 18 is useful for manual adjusting operation to precisely find the position in which the detection field F should be.

In the present embodiment, the light receiving element 32 receives light rays which are directly reflected from the object 71. Alternatively, the apparatus 1 may have a construction in which the element 32 receives scattered light rays from the object 71. In such a construction, the light receiving element holder 31 may be fixed in order that the optical axis 36c will be horizontal in the view of FIG. 3, i.e. the angle A of the axis 36c will be zero, and only the light projecting element holder 21 is moved by the knob 47. The detection field F of such a construction moves on such axis 36c in accordance with the movement of the beam 26, and the indication mark 17 may be marked on the side wall so as to show the position of the axis 36c. The element 32 so adapted to receive the scattered rays is capable of detecting shades of color on a glosy surface of an object.

As another embodiment of the present invention, the rotatable shaft 42 may be vertically positioned and have a clockwise and a counterclockwise threaded portion so that two movable nuts engaging the two threaded portions will vary the angular positions of the holders 21 and 31.

As other embodiment of the present invention, the apparatus 1 may have a construction in which each angular position of the beams 26 and 36 is fixed, and at least one of the optical axes 26c and 36c is vertically moved without any change of the angular position according to the rotational movement of the shaft 42. Moreover, the mechanism for adjusting the optical axes of the two beams 26 and 36 may have a construction in which a cam is utilized or each holder 21 or 31, or in which the holders are moved by an electric servo-motor which, in turn, is driven by an external electric control signal instead of the knob 47 and its associated mechanism.

It will be understood from the foregoing description that the reflection-type photoelectric switching apparatus in accordance with the present invention is capable of precisely detecting an object which is present only in a predetermined, very small detection field, and the detection distance to the detection field therefrom can be easily adjusted from outside of the completely sealed housing. In spite of the very small detection field, the apparatus need not be installed into a desired place with meticulous care since the detection distance is adjustable after the installation.

It should be understood that the above description is merely illustrative of the present invention and that many changes and modifications may be made by those skilled in the art without departing from the scope of the appended claims.

What is claimed:

1. In a reflection-type photoelectric switching apparatus having a light projecting device for projecting a beam of light to an object, a light receiving photoelectric device arranged in side-by-side relation with said light projecting device for receiving a reflected light ray from said object, a circuit device operative in response to output signals from said light receiving device for generating a switching output signal, and a housing for enclosing said light projecting and receiving devices and circuit device, the improvement comprising an optical axis adjusting means which is controllable from outside of said housing for adjusting the optical axis of at least one of said light projecting and receiving devices, said circuit device being coupled to the receiving device and having a predetermined detection level, said light projecting and receiving devices respectively having optical members which allow both the light beam from said projecting device and the light beam incident on said receiving device to pass within a predetermined light path having a predetermined effective zone so that said two light beams will be crossed in a desired detection field, and the distance from said photoelectric switching apparatus to said desired detection field being continuously variable by said optical axis adjusting means.

2. A reflection-type photoelectric swiching apparatus according to claim 1, wherein said light receiving device has a fixed optical axis thereof, and the optical axis of said light projecting device is adjusted into an angle corresponding to said desired distance from the apparatus to the detection field by said optical axis adjusting means.

3. A reflection-type photoelectric switching apparatus according to claim 2, wherein said housing has an indicating mark on a side outer wall thereof for indicating the position of the optical axis of said light receiving device.

4. A reflection-type photoelectric switching apparatus according to claim 1, wherein said optical axis adjusting means is adapted to vary both the optical axis of said light projecting device and that of said receiving device, each into a desired angular position.

5. A reflection-type photoelectric switching apparatus according to claim 4, wherein both of said optical axes are varied in opposite directions at the same angle in response to the adjustment of said adjusting means to be crossed on a ceter line between said light projecting and receiving devices.

6. A reflection-type photoelectric switchng apparatus according to claim 5, wherein said housing has an indicating mark on a side outer wall thereof to show the position of said center line.

7. A reflection-type photoelectric switching apparatus according to claim 1, wherein said optical axis adjusting means comprises a rotatable shaft extending through a back wall of said housing which is rotatable from outside of said housing, a movable nut engaging a threaded portion of said rotatable shaft, and a link member operatively associated with said movable nut for varying the angle of at least one of said light projecting and light receiving devices.

8. A reflection-type photoelectric switching apparatus according to claim 1, wherein said housing consists of a single case having a first and a second opening, and an optically transparent window member which is fitted into said first opening, said window member, light projecting and receiving devices, circuit device and adjusting means, taken together, forming an assembled unit, said first opening having a sufficient sectional area to allow said assembled unit to enter into said case, said circuit device including a cable to be extended out of the housing on final assembling, and said second opening being an outlet for said cable which extends through a wall of said case to sealingly secure said cable therethrough.

9. A reflection-type photoelectric switching appratus accoring to claim 8, wherein said optical axis adjusting means includes a rotatable shaft extending through said case outwardly, and said case further includes a third opening through which said rotatable shaft is extending and supported.

10. A reflection-type photoelectric switching apparatus according to claim 8, wherein said case includes a recessed portion around said first opening, said recessed portion fitting a peripheral edge of said window member so as to sealingly secure said window member.

11. A reflection-type photoelectric switching apparatus according to claim 1, wherein said predetermined light path having a predetermined effective zone is an optical passage which is converged and diverged from said light projecting and receiving devices, respectively.

* * * * *